Feb. 20, 1962  G. E. MINTZ  3,022,088
TANDEM REAR AXLE AIR SPRING SUSPENSION FOR VEHICLES
Filed Feb. 25, 1959  3 Sheets-Sheet 1

INVENTOR
GERALD E. MINTZ
BY
HIS ATTORNEYS

Feb. 20, 1962 G. E. MINTZ 3,022,088
TANDEM REAR AXLE AIR SPRING SUSPENSION FOR VEHICLES
Filed Feb. 25, 1959 3 Sheets-Sheet 2
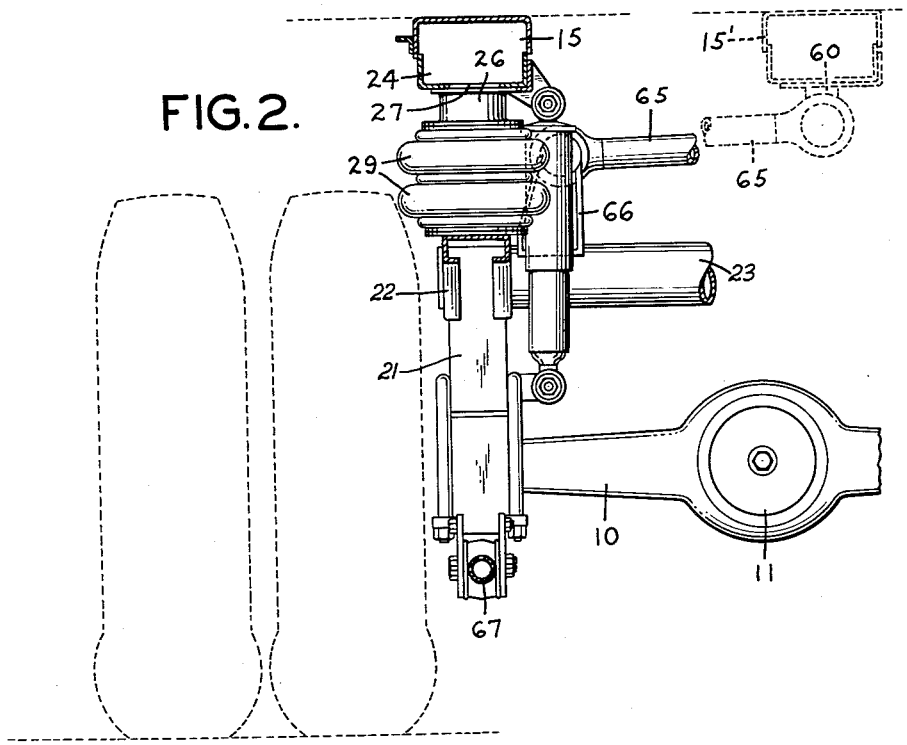
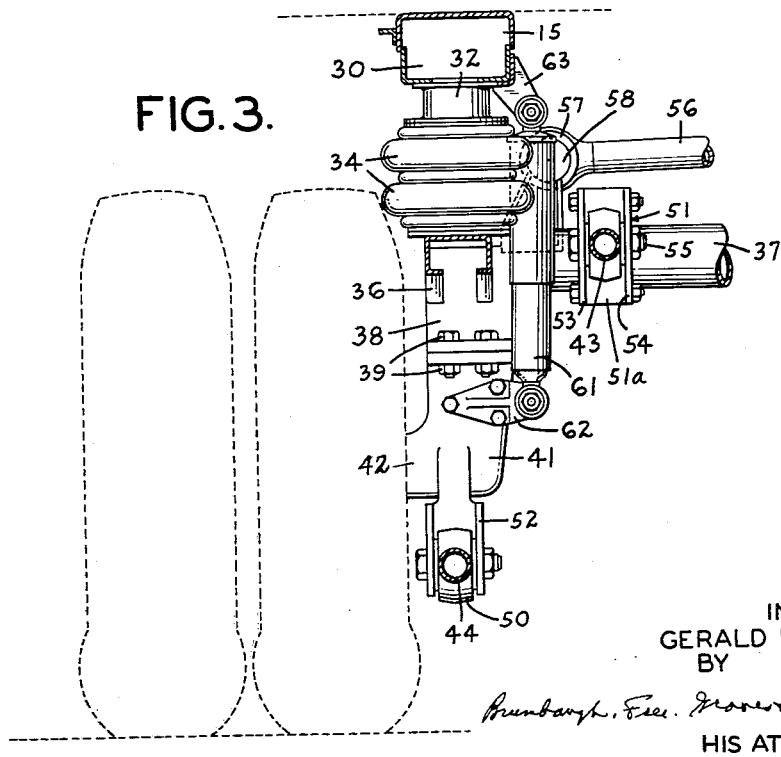
INVENTOR
GERALD E. MINTZ
BY
HIS ATTORNEYS

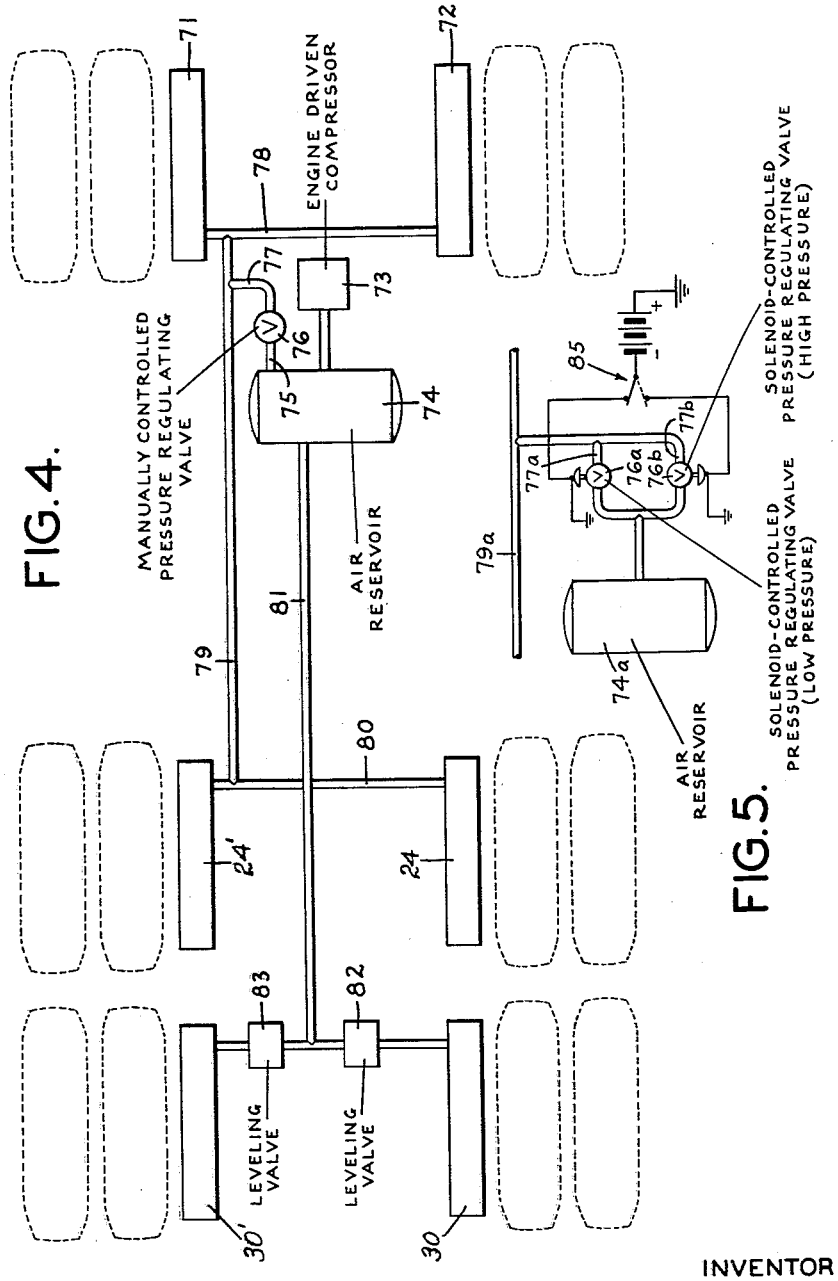

United States Patent Office 3,022,088
Patented Feb. 20, 1962

3,022,088
TANDEM REAR AXLE AIR SPRING SUSPENSION FOR VEHICLES
Gerald E. Mintz, Emmaus, Pa., assignor to Mack Trucks, Inc., Plainfield, N.J., a corporation of New York
Filed Feb. 25, 1959, Ser. No. 795,444
5 Claims. (Cl. 280—124)

This invention relates to improvements in spring suspensions for vehicles and it relates particularly to an air spring suspension for the vehicles having multiple rear axles.

Buses have been provided heretofore with dual rear axles and air springs for the front and rear axles by means of which road shock is dissipated and the vehicle is maintained substantially level by varying the pressure in the air springs under the control of leveling valves. As the distribution of load in such buses increases or decreases, the leveling valves admit more air to or discharge air from the air springs in order to maintain the bus body on an even keel and with a predetermined road clearance. Systems for accomplishing the above are quite complex and include leveling valves for all of the axles. The inclusion of such multiple leveling action increases the possibility of malfunctioning or failure of the system and also renders the suspension sensitive to minor changes of no importance in the operation of the vehicle.

In accordance with the present invention, an improved suspension is provided for vehicles having dual rear axles whereby the action of the springs may in part be controlled by means of one or two leveling valves while the over-all action of the springs is under the control of the operator of the vehicle so that he can change the riding characteristics and the road clearance of the vehicle as may be desired or required.

More particularly, in accordance with the present invention, the air springs for the front axle of the vehicle and the air springs of one of the dual rear axles is controlled by the driver by means of a manually-controlled pressure-regulating valve. In this way, the front axle and one of the rear axles are maintained under equal pressures selected by the driver to control the road clearance and the load-supporting or riding characteristics of the vehicle. The other rear axle of the vehicle is provided with one or more leveling valves which operate in response to shifting of weight in the vehicle to maintain the vehicle body level by admitting air into or venting air from the air spring suspension associated with the corresponding axle, as may be required. In this way, automatic leveling together with manual control over the shock cushioning action of the air spring suspension is obtained.

For a better understanding of the present invention, reference may be had to the accompanying drawings in which:

FIGURE 2 is a view in section taken on line 2—2 of FIGURE 1;

FIGURE 3 is a view in section taken on line 3—3 of FIGURE 1;

FIGURE 4 is a schematic plan view of the front and tandem axle suspensions illustrating the air connections for the system; and FIGURE 5 is a schematic illustration of modified air connections for the system.

Figure 1:
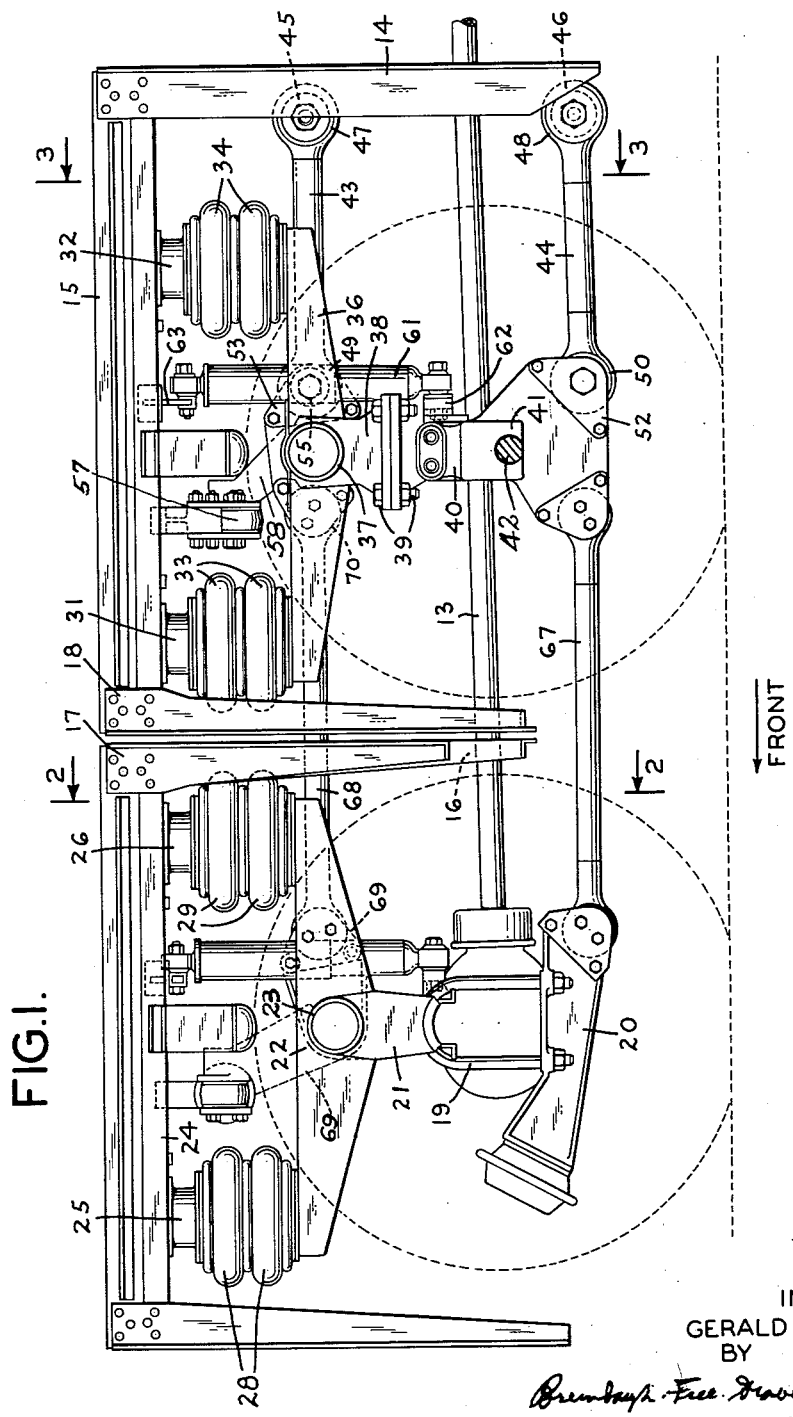
FIGURE 1 is a view in side elevation of a tandem rear axle suspension of the type embodying the present invention with wheels shown in dotted lines and portions of the live axle and the drive therefor omitted for clarity.

FIGURES 1 to 3 of the drawings illustrate one side only of a typical air spring suspension embodying the present invention, the opposite side being essentially a mirror image of that shown in FIGURES 1 to 3. Also, the invention, as indicated in FIGURE 1, is illustrated with a tandem axle suspension in which the front, rear axle is driven by means of a rear mounted engine in the vehicle, and the rear wheels are not driven. The tandem axle suspension can be used with any type of heavy-duty vehicle, such as a bus or truck, which is required to carry relatively heavy loads over various types of roadways.

Referring now to FIGURES 1 and 2, the front, rear axle of the tandem suspension includes an axle housing 10 having a differential housing 11 containing a differential connected by means of suitable universals and a propeller shaft 13 to a rear engine which is carried at the rear of the vehicle behind a transverse frame or bulkhead member 14 suspended from the side frame members 15, 15' of the vehicle. The propeller shaft 13 passes through a centrally-located slot 16 in a pair of transverse frames or bulkhead members 17 and 18 which are also connected at their upper ends to the side frames 15, 15' of the vehicle. The axle housing 10 is secured by means of U-bolts 19 and a hanger member 20 to a pedestal 21 which has a longitudinally-extending beam 22 fixed to its upper end. A transverse tubular reinforcing element 23 extends from the middle of the beam 22 to the middle of a corresponding beam on the opposite side of the vehicle connecting them rigidly. Supported on the undersides of the frame members 15, 15' are reservoirs 24 which may be formed of welded channel or sheet members to form closed, generally rectangular tanks or reservoirs for receiving air under pressure. Extending downwardly from the undersurface of each end of the reservoir 24, as viewed in FIGURE 1, are sleeves 25 and 26 which communicate with the interior of the reservoir by means of openings 27 (FIGURE 2). Secured between the lower ends of each of the tubular members 25 and 26 and to the opposite ends of the beam 22 are hollow multiple air spring elements 28 and 29 of conventional type which communicate with the reservoir or tank 24 through the tubular members 25 and 26 and the openings 27.

The rear, rear axle of the tandem assembly also includes a reservoir 30 on each side frame member 15 which communicates by means of the sleeves 31 and 32 with the air springs 33 and 34 which engage the opposite ends of the longitudinal beam 36 on each side of the vehicle. The beams 36 on opposite sides of the vehicle are connected by a tubular reinforcing member 37 and each beam 36 is provided with a pedestal 38 which by means of the bolts 39 are connected to the hangers 40 on side plates 41 from which extend stub axles 42 (FIGURE 3) on which the wheels are mounted. Thus, the rear, rear axle suspension of the suspension does not have an axle extending between the hangers 41 on opposite sides of the vehicle so the propeller shaft 13 can pass without interference through the rear, rear axle suspension without interference.

The pedestals and air springs on each side of the vehicle are stabilized in a fore-and-aft direction by means of a pair of links 43 and 44 which are pivotally connected to brackets 45 and 46 carried by the bulkhead 14. The eyes 47 and 48, as well as the eyes 49 and 50 at opposite ends of the links 43 and 44, may be of the rubber bushed type to permit limited universal movement of the links relative to the bulkhead 14. The forward ends of each pair of links 43 and 44 are connected to the brackets 51 and 52 secured to the corresponding side assembly of the air spring suspension. As shown in FIGURE 3, the bracket 51 extends rearwardly from and is mounted on the tubular cross-member 37, while the bracket 52 extends downwardly from the hanger 41 and is formed as a part thereof. As illustrated, the bracket 51 is formed of pairs of spaced plates 53 and 54 detachably connected to opposite sides of a rigid extension 51a from the cross member 37. The eye 49 of the radius rod is secured between the plates by means of a transverse bolt 55. Bracket 52 is formed similarly.

Lateral stability of the rear, rear axle is achieved by means of an anti-sway bar 56 having a rubber bushed eye 57 at one end which is pivotally connected to an arm 58 which extends upwardly from the tube 37. The anti-sway bar 56 extends transversely of the vehicle and its opposite end is connected to a bracket corresponding to the bracket 60 (FIGURE 2) which extends downwardly from the side frame member 15' of the vehicle.

Shock absorbers of any suitable type may be used. For example, airplane-type shock absorbers 61 are connected between a bracket 62 on the axle member 41 and a bracket 63 extending inwardly and downwardly from the inner, lower edge of the air reservoir 30.

Stabilization of the front, rear axle suspension is accomplished in generally a similar manner. Lateral stability is achieved by the anti-sway bar 65 which is connected at one end to the bracket 60 as described above, and at its opposite end to an upright member 66 on the tubular reinforcing element 23. Fore-and-aft stability is achieved by means of a radius rod 67 on each side connecting the hanger 41 to the hanger 20. Also, upper radius rods 68 are provided which pivotally connect the bracket 69 and 70 on the tubular reinforcing elements 23 and 37.

In a vehicle utilizing a tandem rear suspension of the type described above, an air spring suspension for the front axle of the vehicle may also be provided which is similar to the rear, rear air suspension described above. The principal difference between the front suspension and the rear, rear axle suspension disclosed herein is that the front wheels are mounted for steering movement.

FIGURE 4 illustrates schematically the arrangement of the air supply system for the air springs. The air reservoirs for the front suspension are identified as reservoirs 71 and 72, while the reservoirs on opposite sides of the vehicle for the tandem rear axle suspension are identified as 24 and 24', and 30 and 30'. As is common in air suspensions, air may be supplied by means of an engine-drive compressor 73 to a reservoir 74 which may be provided with unloading valves and the like to maintain a predetermined pressure in the reservoir. In accordance with the present invention, air is supplied from the reservoir 74 through a pipe 75 to a manually-controlled, pressure-regulating valve 76 of conventional type which is mounted in the vehicle near the driver so that he can adjust the air pressure discharged from the valve 76 to any desired value. The air under the control of the valve 76 is supplied through the conduits 77 and 78 to the front air spring reservoirs 71 and 72 and through the conduits 79 and 80 to the front rear axle reservoirs 24 and 24' so that the air pressure in all of the reservoirs 24, 24', 71 and 72 is the same. This establishes generally the resistance to deflection or rate of the springs. The pressure can be varied depending upon the load carried by the vehicle and the riding characteristic required for a given type of road. Leveling of the vehicle is accomplished by supplying air through the conduit 81 to a pair of leveling valves 82 and 83 which are interposed between the conduit 81 and the reservoirs 30 and 30'. The leveling valves may be of the type disclosed, for example, in the Rossman Patent No. 2,670,201. With such leveling valves, depression of the vehicle frame with respect to the axle causes the valve to open after a short delay and thereby admit more air to the air spring which is more compressed. By arranging two leveling valves 82 and 83 responsive to fore-and-aft tilting and transverse tilting, the leveling valves will compensate for shifting of the load fore-and-aft as well as transversely. In this way, the vehicle is maintained on an even keel, except during momentary deflections thereof which are necessary in the springing of the vehicle.

It will be understood that a single leveling valve can be used, if desired, to level the vehicle either transversely or longitudinally, depending upon requirements.

With the arrangement described, the driver can reduce the pressure in the reservoirs 24, 24' and 71, 72 when the vehicle is traveling light or unloaded or over a relatively rough road to obtain a soft cushioned ride. Under these conditions, the leveling valve or valves 82, 83 will maintain the vehicle leveled in fore-and-aft and transverse directions. When the vehicle is more heavily loaded, a greater pressure can be maintained in the reservoirs 24, 24', 71 and 72 to maintain a proper road clearance and change the rate of the springs to obtain a smooth and comfortable ride.

As a general rule, it is unnecessary to provide a substantially continuous range of pressure adjustment of the valve 76, and, moreover, leaving the regulation of the valve 76 to the driver's judgment may also result in improper operation of the air spring suspension. A satisfactory solution to these problems is to use a pressure regulating valve 76 which has two positions supplying different pressures or to provide two pressure regulating valves in parallel which are operated selectively by a switch at the driver's position.

Thus, as shown in FIGURE 5, a two position switch 85 on the instrument panel of the vehicle opens selectively the normally closed solenoid-controlled pressure regulating valves 76a and 76b which are connected in parallel conduits 77a and 77b between the air reservoir 74a and the conduit 79a leading to the air spring reservoirs of the front axle and one of the rear axles. Inasmuch as each of the valves 76a and 76b can be adjusted to supply air at one selected pressure to the air springs, the operator can supply air at a selected lower pressure or air at a selected higher pressure to the air springs, by opening one of valves 76a and 76b by means of the switch 85.

Regardless of the distribution of the load, the leveling valves will maintain the vehicle on an even keel. In this way, the action of the air springs can be regulated according to load-carrying capacity and greatest comfort and for the best traction with the use of a minimum of regulating equipment thereby greatly improving, yet simplifying the system.

It will be understood that the structure of the air springs can be modified considerably depending upon the type of vehicle used. In vehicles which are not intended to carry heavy loads, the beams which carry the air spring bellows can be omitted and a single air spring mounted at the top of each of the pedestals.

It will be understood, moreover, that the size of the bellows and the reservoirs above and communicating with the bellows can be modified, if desired, and that the reservoirs can be substituted for the beams 22 and 36. Accordingly, the form of the invention described herein should be considered as illustrative and not as limiting the scope of the following claims.

I claim:

1. A suspension for vehicles comprising a vehicle chassis, a front axle suspension, a front rear axle suspension, a rear rear axle suspension, air springs in said rear axle suspensions supporting said chassis on said suspensions, a source of air pressure connected with said air springs, manually-controlled pressure-regulating valve means for supplying air selectively at different pressures solely to the air springs of one of said rear axle suspensions, and at least one leveling valve interposed between said source and the air springs of the other rear axle suspension responsive to prolonged displacement of said chassis relative to said rear axle suspensions for controlling solely the pressure of the air in the last-mentioned air springs to control the spacing between said chassis and said suspensions.

2. A suspension for a vehicle comprising a vehicle chassis, a front axle suspension, air springs in said front axle suspension supporting the front end of said chassis thereon, a front rear axle suspension, a rear rear axle suspension, a pair of air reservoirs fixed to and spaced longitudinally of each side of said chassis, air springs in said rear axle suspensions below and communicating with said reservoirs and supporting the rear of said chassis on said rear axle suspensions, a source of air under pressure connected to each of said reservoirs and the air springs of said front axle suspension, manually-controlled pressure-regulating valve means for supplying air selectively at different pressures interposed between said source, the air springs of said front axle suspension and the reservoirs of one of said rear axle suspensions for regulating solely the pressure of the air in said air springs, and at least one leveling valve responsive to a prolonged displacement of said chassis relative to the other rear axle suspension for regulating solely the pressure of the air in the air springs of said other rear axle suspension.

3. A suspension for vehicles comprising a vehicle chassis, a front axle suspension, a first pair of air reservoirs fixed to opposite sides of said chassis, a second pair of air reservoirs fixed to opposite sides of said chassis in lengthwise spaced relation to said first pair of reservoirs, beams extending lengthwise of said chassis below and corresponding to each reservoir, an air spring interposed between each end of each reservoir and the corresponding beam and connecting with said reservoir, axles for supporting wheels carried by said beams, means for stabilizing said beams against substantial lengthwise and lateral movement relative to said chassis, a source of air under pressure connected to each of said reservoirs, a manually-controlled pressure-regulating valve means interposed between said source and said first pair of reservoirs for supplying air selectively at different pressures solely to said first pair of reservoirs and the air springs communicating therewith, and at least one leveling valve responsive to prolonged displacement of said chassis relative to the other pair of beams for regulating solely the air pressure in the second pair of reservoirs and the air springs communicating therewith to maintain a predetermined spacing between said chassis and said axles.

4. A suspension for vehicles comprising a vehicle chassis, a front axle suspension, a front rear axle suspension, a rear rear axle suspension, air springs in said suspensions supporting said chassis on said suspensions, a source of air pressure connected with said air springs, manually-operated pressure-regulating valve means for selectively supplying air at one of two different pressures solely to the air springs of said front axle suspension and the air springs of one of said rear axle suspensions, and at least one leveling valve interposed between said source and the air springs of the other rear axle suspension for controlling solely the pressure of the air in the last-mentioned air springs.

5. A dual rear axle suspension for vehicles comprising a vehicle chassis, a front, rear axle suspension, a rear, rear axle suspension, air springs in said suspensions supporting said chassis on said suspensions, a source of air pressure connected with said air springs, a pair of pressure-regulating valves interposed between said source of air pressure and the air springs of one of said rear axle suspensions, one of said valves when open supplying air at higher pressure to the air springs of said one suspension than the other valve, when the latter is open, means operable by the driver of said vehicle for selectively opening one of said valves and closing the other to supply air selectively at higher and lower pressure to said air springs of said one suspension, and at least one leveling valve interposed between said source and the air springs of the other rear axle suspension for controlling the pressure of the air in the last-mentioned air springs.

References Cited in the file of this patent
UNITED STATES PATENTS

| | | |
|---|---|---|
| 1,721,732 | Hawkins | July 23, 1929 |
| 2,691,420 | Fox | Oct. 12, 1954 |
| 2,901,242 | Elliot et al. | Aug. 25, 1959 |